United States Patent [19]

Goldblatt et al.

[11] Patent Number: 4,925,023
[45] Date of Patent: May 15, 1990

[54] COMPACT DISC PACKAGE

[76] Inventors: Jeffrey P. Goldblatt, 128 Parkside Crescent, Rochester, N.Y. 14617; Paul R. Gassman, 87 Berehaven Dr., Amherst, N.Y. 14120

[21] Appl. No.: 362,096

[22] Filed: Jun. 6, 1989

[51] Int. Cl.⁵ .............................................. B65D 85/57
[52] U.S. Cl. .................................... 206/309; 206/807; 229/125.02
[58] Field of Search ................ 206/307, 309, 312, 313, 206/1.5, 387, 444, 807; 229/125.02, 125.05, 125.15, 165, 180

[56] References Cited

U.S. PATENT DOCUMENTS

| | | | |
|---|---|---|---|
| 3,091,330 | 5/1963 | Roks | 206/309 |
| 3,587,837 | 6/1971 | Smith | 206/387 |
| 3,656,612 | 4/1972 | Sellors | 206/387 |
| 3,675,763 | 7/1972 | Sandel | 206/387 |
| 3,682,297 | 8/1972 | Austin et al. | 206/387 |
| 3,761,010 | 9/1973 | Rosenburg, Jr. | 206/1.5 |
| 4,307,809 | 12/1981 | Haswell | 211/40 |
| 4,694,954 | 9/1987 | Moss | 206/45 |
| 4,709,812 | 12/1987 | Kosterka | 206/310 |
| 4,712,679 | 12/1987 | Lowe | 206/387 |
| 4,718,547 | 1/1988 | MacTavish | 206/309 |

Primary Examiner—Jimmy G. Foster
Attorney, Agent, or Firm—Shlesinger & Myers

[57] ABSTRACT

A blank for forming a package for a compact disc jewel box comprises a sheet which has a front panel, a first side panel adjacent the front panel, a back panel adjacent the first side panel, a second side panel adjacent the back panel, and a security panel adjacent the second side panel. Each of the panels includes a common hinge line interconnecting the adjacent panels. The sheet is adapted to form a package having the front, back, first and second side panels, first and second ends, and an intermediate portion. The front, back, first and second side panels each has left and right end flaps. Each of the end flaps includes a common hinge line interconnecting each of the end flaps to its respective panel. The end flaps are adapted to close the first and second ends of the package. The security panel includes a cut-out in an intermediate portion thereof substantially spaced from the first and second ends of the package when the sheet is erected into the package for forming a pocket means therein for positioning the jewel box in the intermediate portion of the package, thereby preventing the jewel box from sliding out of any open end of the package.

A package made from the blank is also disclosed.

27 Claims, 5 Drawing Sheets

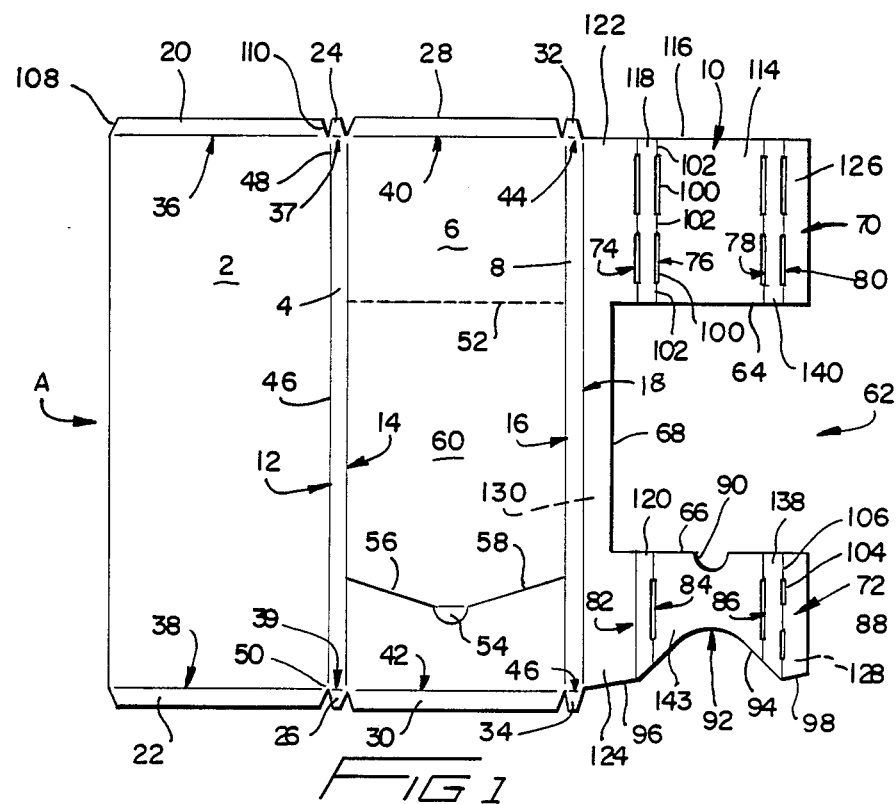
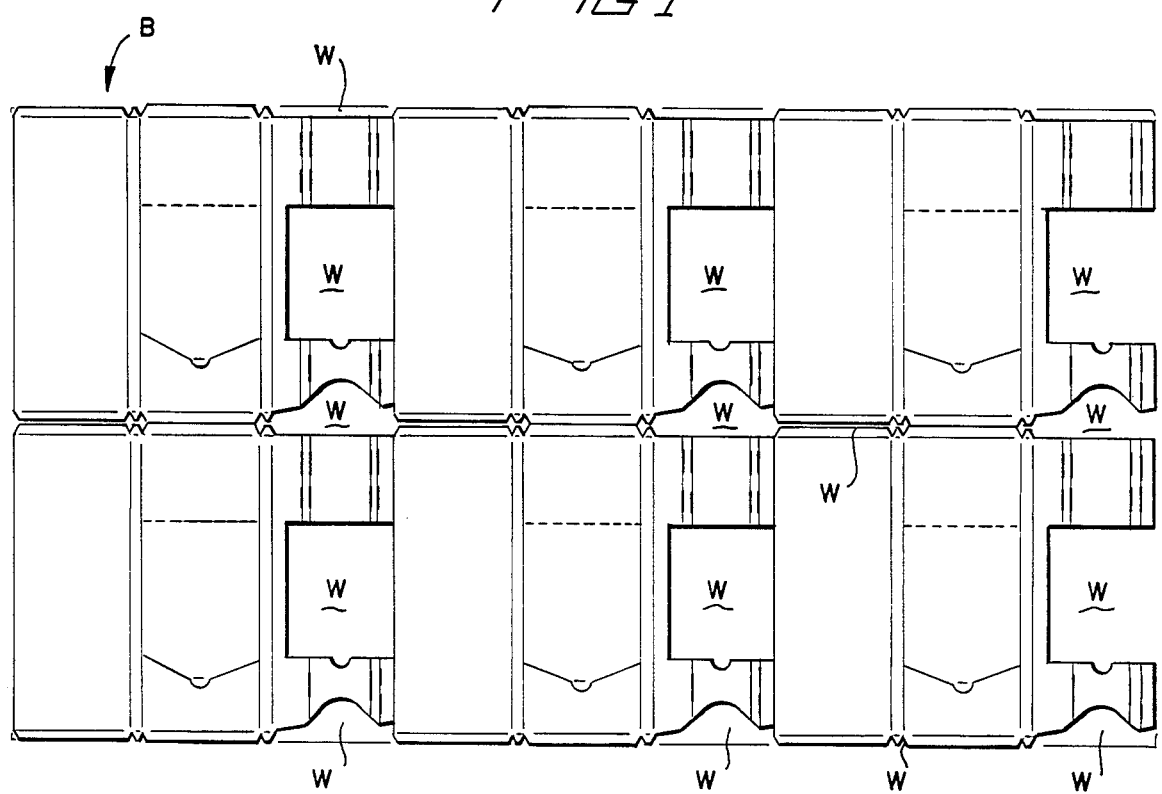
FIG 1
FIG 2

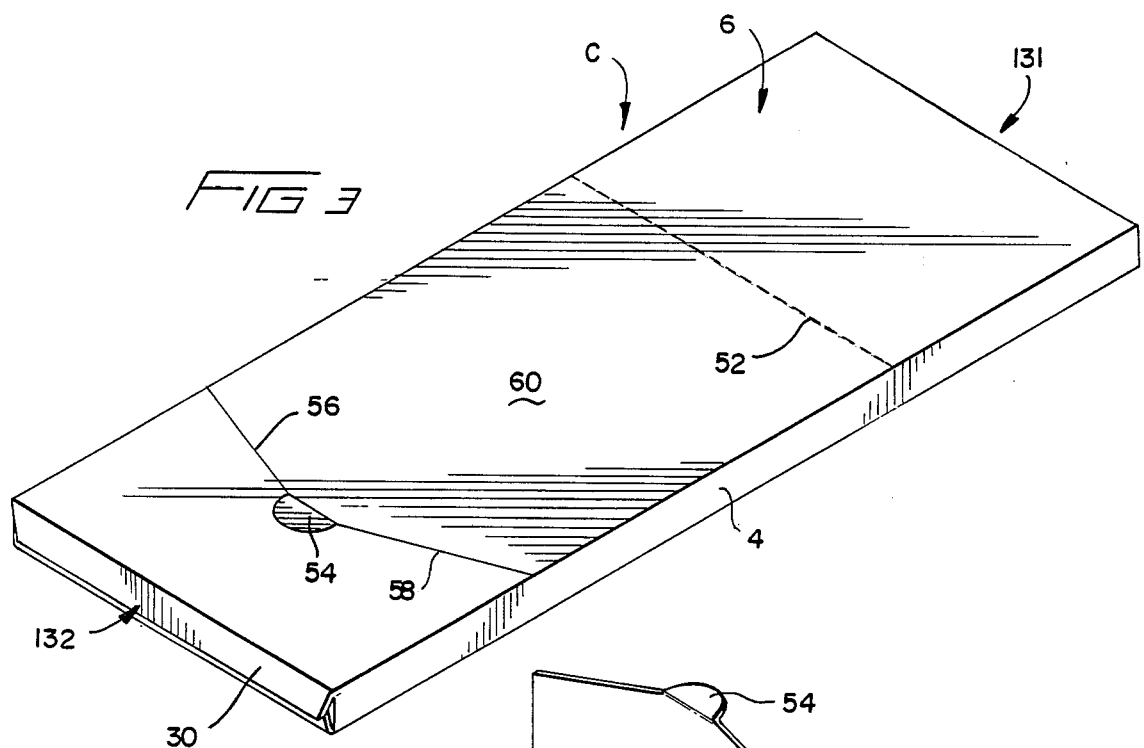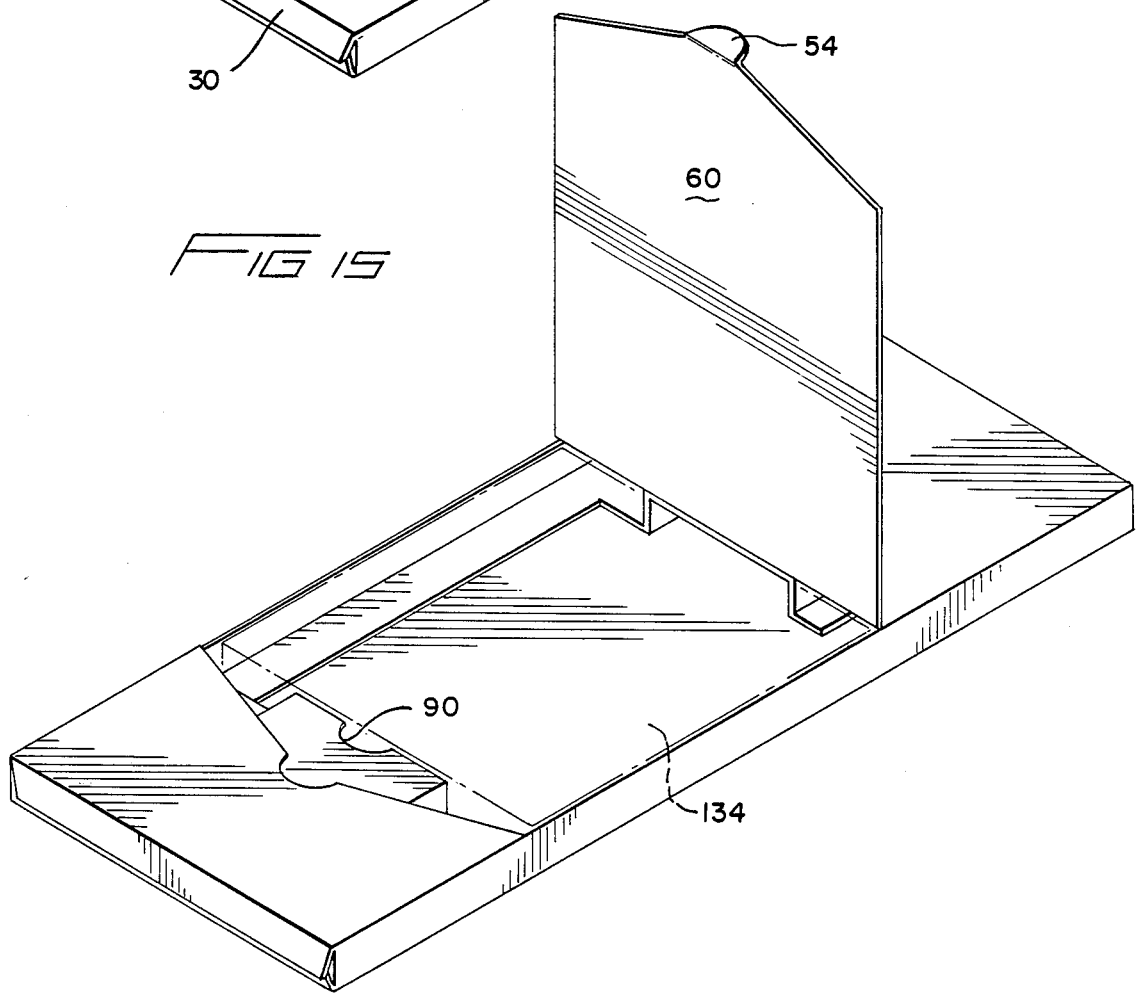

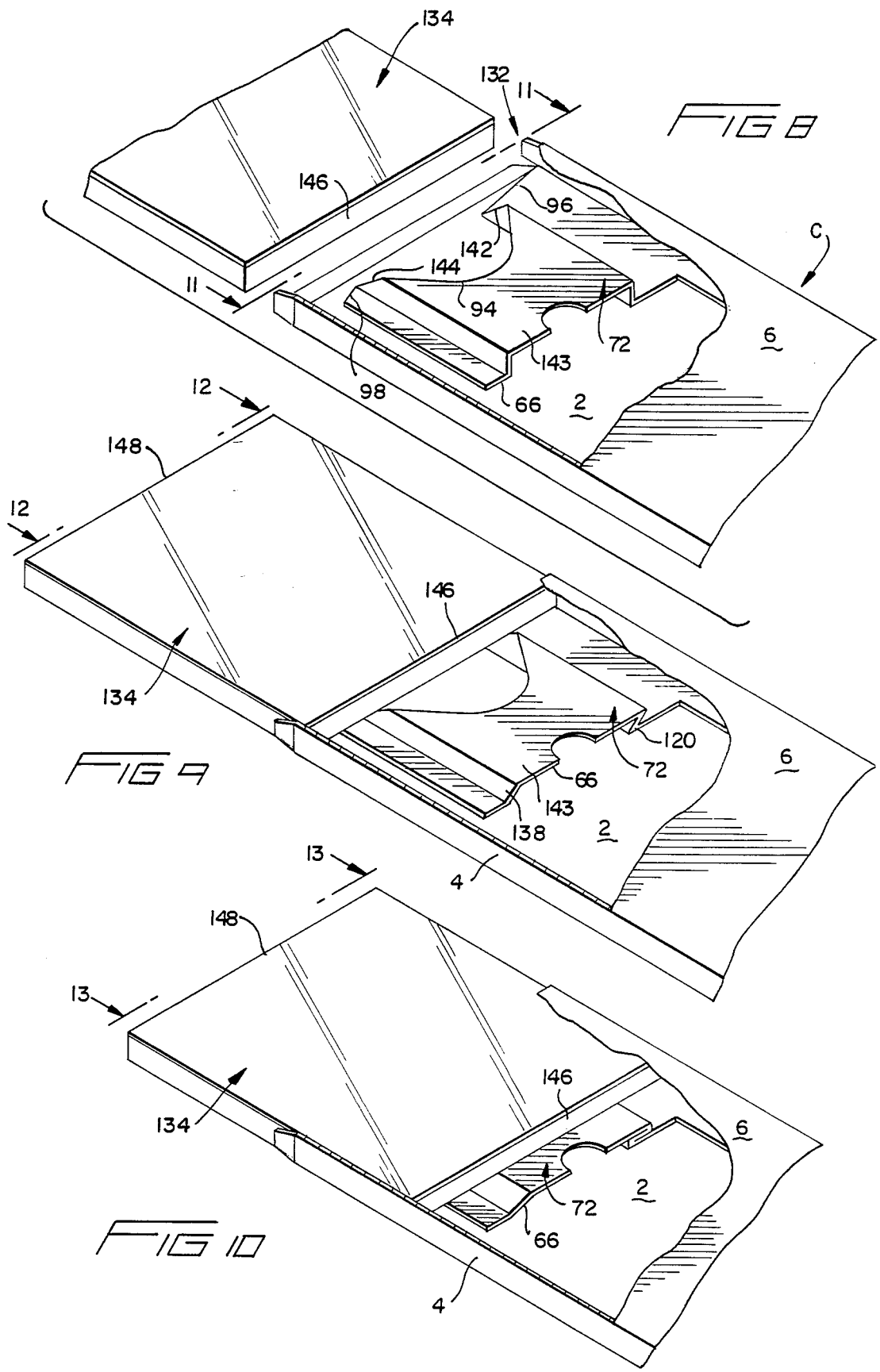

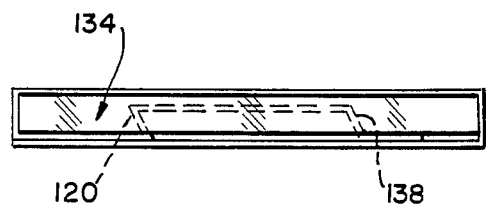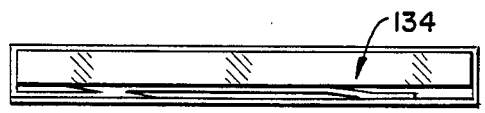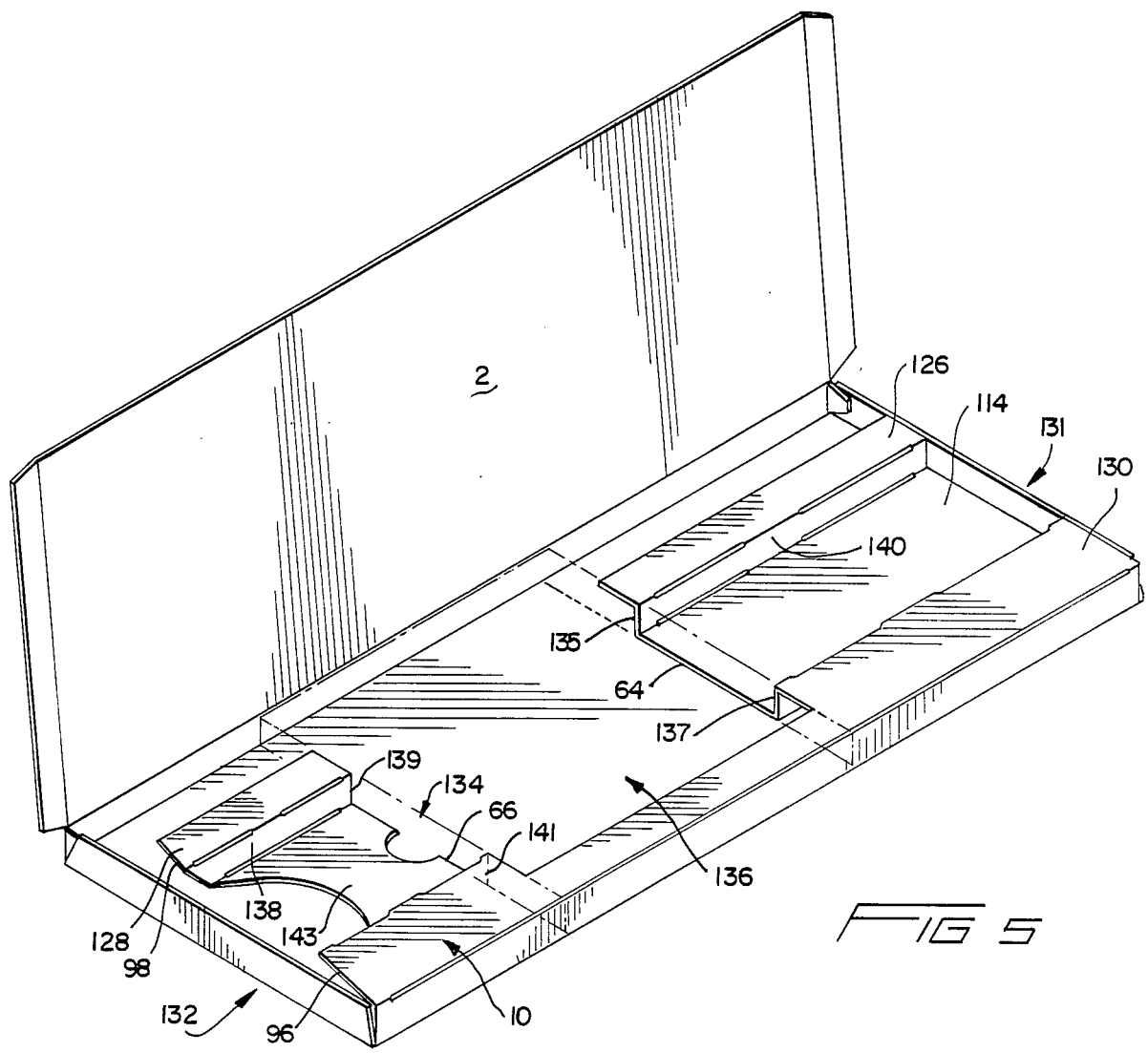

COMPACT DISC PACKAGE

FIELD OF THE INVENTION

The present invention relates to a package for a compact disc jewel box and in particular to a package for deterring theft of compact discs.

BACKGROUND OF THE INVENTION

A compact disc is normally contained in a container called "jewel box" in the industry. The jewel box is in turn packaged in a container which is substantially twice as long as the jewel. Since the compact disc and the jewel box is roughly 5 inches across, it is small enough for a shoplifter to conceal for stealing. The package for the jewel box is designed to deter stealing by making the package large enough to prevent easy concealment by a shoplifter.

However, the present package available today has not discouraged theft. The jewel box is normally contained in the package such that the jewel box is adjacent one end of the package, which makes it relatively easy for the shoplifter to open the adjacent end and allow the jewel box to drop unnoticed into the shoplifter's purse, bag or the like.

OBJECTS AND SUMMARY OF THE INVENTION

It is therefore an object of the present invention to provide a package for a compact disc jewel box which deters shoplifting.

It is another object of the present invention to provide a package for a compact disc jewel box which prevents pilfering by preventing the jewel box from dropping from an open end of the package.

It is still another object of the present invention to provide a package for a compact disc jewel box designed to lock the jewel box in the center portion of the package, thereby preventing the jewel box from sliding through an open end of the package.

It yet another object of the present invention to provide a package for a compact disc jewel box which prevents access to the jewel box without visibly tearing the package apart.

It is an object of the present invention to provide a package for a compact disc jewel box which provides a readily observable means for indicating tampering of the package.

It is another object of the present invention to provide a package for a compact disc jewel box which makes the jewel box relatively inaccessible to a shoplifter but easily removable therefrom by an owner.

It is still another object of the present invention to provide a package for a compact disc jewel box which provides easy insertion of the jewel box into the package from one end of the package.

It is yet another object of the present invention to provide a package for a compact disc jewel box which permits loading of the jewel box into the package from one end of the package without snagging.

It is a further object of the present invention to provide a package for a compact disc jewel box which locks the jewel box in a center portion of the package after insertion into the package.

It is an object of the present invention to provide a package for a compact disc jewel box which is amenable to multiple carton blanking from a single standard carton sheet with minimum amount of waste.

In summary, the present invention provides a package for a compact disc jewel box which locks the jewel box in the center portion of the package, thereby preventing a shoplifter easy access from either end of the package.

DESCRIPTIONS OF THE DRAWINGS

FIG. 1 is a plan view of a carton blank according to the present invention.

FIG. 2 is a plan view of a carton blank from FIG. 1 arranged in a "six-up" configuration.

FIG. 3 is a back panel perspective view of a package erected from a carton blank from FIG. 1.

FIG. 5 is a perspective view of a partially erected package from a carton blank from FIG. 1, showing a pocket within the package for positioning a jewel box therein.

Figure 4:
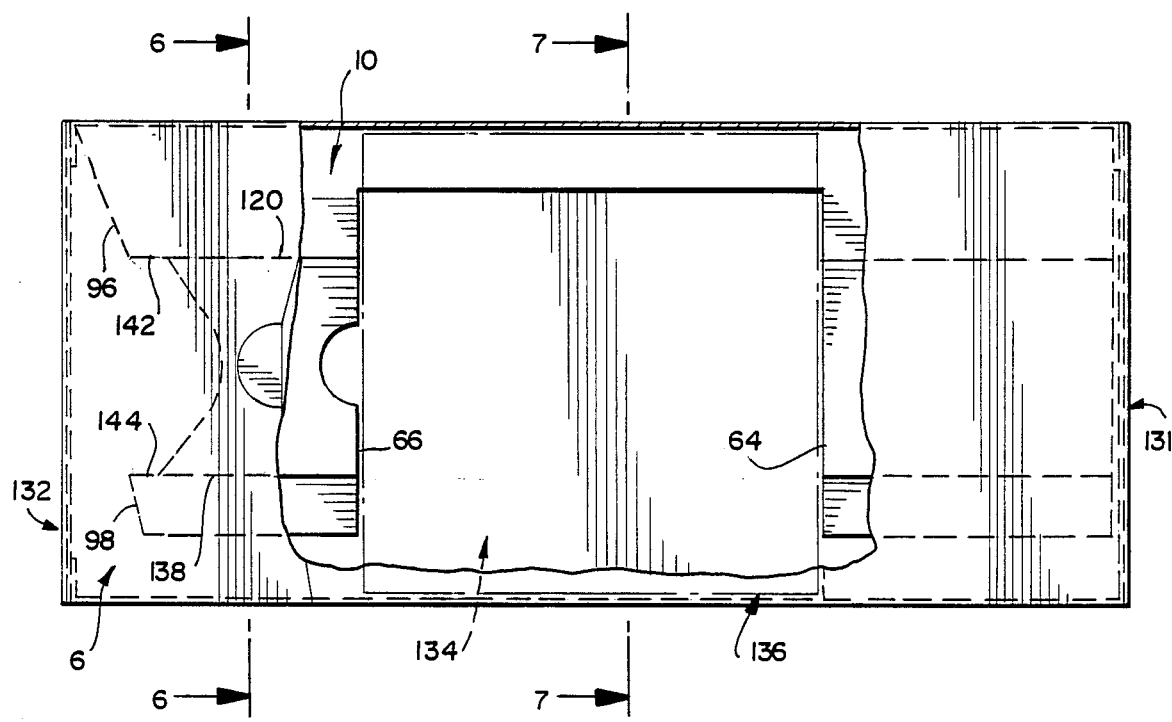
FIG. 4 is a partly cut-away, top view, portions of which are shown in phantom lines, of a package from FIG. 3.
Figure 6:
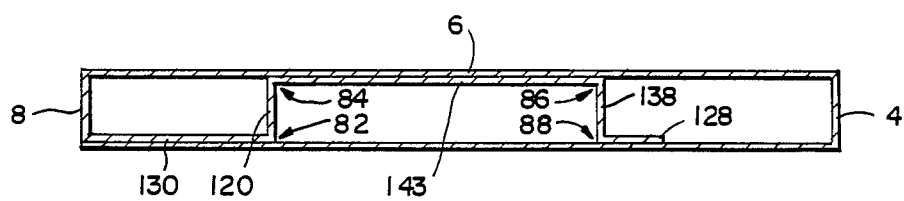
Figure 7:
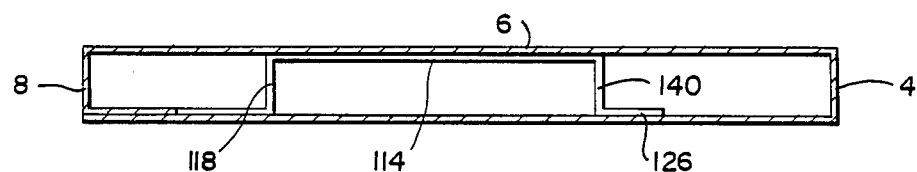

FIGS. 6 and 7 are sectional views taken from FIG. 4 along lines 6—6 and 7—7, respectively.

FIGS. 8, 9 and 10 are cut-away, fragmentary, perspective views of a package from FIG. 3, showing a loading sequence of a jewel box into the package.

FIGS. 11, 12 and 13 are end views taken from FIGS. 8, 9 and 10, respectively, along lines 11—11, 12—12 and 13—13, respectively.

FIG. 14 is an end view looking from the open end of the package after a loading sequence shown in FIGS. 8 through 13.

FIG. 15 is a perspective view of a package from FIG. 3, showing an access panel in an open position.

DETAILED DESCRIPTION OF THE INVENTION

FIGS. 1, 2 AND 3

A carton blank A of the present invention, preferably made from paperboard, carton material and the like, comprises a front panel 2, a first edge panel 4, a back panel 6, a second edge panel 8 and a security panel 10. A hinge line 12 operably connects the panel 2 to the first edge panel 4. A hinge line 14 operably connects the first edge panel 4 to the back panel 6. A hinge line 16 operably connects the back panel 6 to the second edge panel 8. A hinge line 18 operably connects the second edge panel 8 to the security panel 10. The front panel 2 includes end flaps 20 and 22. The first edge panel includes end tabs 24 and 26. The back panel 6 includes end flaps 28 and 30. The second edge panel 8 includes end tabs 32 and 34. Hinge lines 36 and 38 operably connect the respective end flaps 20 and 22 to the front panel 2. The hinge lines 37 and 39 operably connect the respective end tabs 24 and 26. The hinge lines 40 and 42 operably connect the respective end flaps 28 and 30 to the back panel 6. Hinge lines 44 and 46 operably connect the respective end tabs 32 and 34 to the second edge panel 8.

The hinge lines 12, 14, 16 and 18 preferably each includes a cut-score line along a substantial length thereof and disposed on the opposite face of the blank A, and a crease at each end portion of the hinge lines for ease of folding while providing strength at the corners. Similarly, the hinge lines 36, 38, 40 and 42 preferably each includes a score line along a substantial length thereof and disposed on the opposite face of the blank A, and a fold line at each end portion of the hinge lines. For the sake of clarity, only the hinge line 12 will be described in detail, but it should be understood that the description equally applies to the other above mentioned hinge lines 14, 16, 18, 36, 38, 40 and 42. The hinge line 12 includes a score line 46 disposed along a substantial portion thereof and disposed on the opposite face of the blank A, and fold lines 48 and 50, each of which is disposed at the respective end portion of the hinge line 12.

The back panel 6 includes a perforated line 52 disposed transverse to the hinge lines 14 and 16 and across the width of the back panel 6. A pull-out tab 54 is disposed at the intersection of a pair of inclined score lines 56 and 58 disposed on the opposite face of the blank A. The perforated line 52, the inclined score lines 56 and 58, and portions of hinge lines 14 and 16 define an area 60, the purposes of which will become evident below.

The security panel 10 includes a rectangular U-shaped cut-out 62 in the intermediate portion of the panel 10 and adapted for a jewel box to fit therein. The cut-out 62 is bounded by a first edge 64, a second edge 66 and a third edge 68. The first edge 64 is substantially in line with the perforated line 52 on the back panel 6. The cut-out 62 substantially divides the security panel 10 into a first end portion 70 and a second end portion 72. The first end portion 70 is substantially rectangular and includes parallel hinge lines 74, 76, 78 and 80 disposed parallel to hinge line 18. The second end portion 72 includes corresponding parallel hinge lines 82, 84, 86 and 88, each of which is coincident with the respective hinge lines 74, 76, 78 and 80 on the first end portion 70. A notch 90 is disposed intermediate the second edge 66 of the cut-out 62.

The second end portion 72 includes an edge 92 disposed away from the second edge 66. The edge 92 includes an arcuate portion 94 and inclined edge portions 96 and 98, each being disposed at each end of the arcuate portion 94. Each of the inclined edge portions 96 and 98 is generally inwardly directed toward the second end portion 72. The edge portion 98 is substantially parallel to and outwardly offset from edge portion 96.

Each of the hinge lines 74, 76, 78 and 80 includes slit portions 100 and perforated portions 102. Similarly, each hinge lines 84, 86 and 88 includes slit portions 104 and perforated portions 106. Hinge line 82 is simply a fold line for purposes which will be fully described below.

Edge portions 108 and 110 of the end flap 20 are tapered to facilitate erection of the carton blank A. Corresponding edge portions of end flaps 22, 28 and 30 and end tabs 24, 26, 32 and 34 are similarly tapered.

A six-up blank B having six blanks A, as best shown in FIG. 2, generates relatively little waste material W.

The blank A is erected into a package C, as best shown in FIG. 3, in the following manner. Adhesive (not shown) or other conventional means (not shown) is applied on at least a portion of the area 114 bounded by the hinge lines 76 and 78, first edge 64 and outer edge portion 116. The security panel 10 is folded along hinge lines 74, 76, 82 and 84 to permit panel portions 118 and 120 to overlie panel portion 122 and 124, respectively. The blank A is now folded along hinge line 16 until side panel 8 and security panel 10 overly back panel 6, permitting the panel portion 114 to adhere or otherwise be secured to the back panel 6, while maintaining panel portions 118 and 120 in their folded positions. Adhesive (not shown) or other conventional means (not shown) is now applied on at least a portion of the opposite sides of the panel portions 126, 128 and 130. The front panel 2 is then folded along hinge line 12 until it overlies and adheres or otherwise be secured to the opposite sides of the panel portions 126, 128 and 130. The folded blank A is now erected into a tube. The front panel 2 is substantially equal to the dimension of the back panel 6, and the first side panel 4 is similarly substantially equal to the dimension of the second side panel 8, such that a rectangular tube is formed. The end tabs 24 and 32 are folded inwardly to form support surfaces for the end flaps 20 and 28 which are then folded inwardly and secured to each other by adhesive (not shown) or other suitable means (not shown) to close off the end 131 of the package C. The end tabs 26 and 34 and the end flaps 22 and 30 are similarly folded inwardly to close off the other end 132 of the package C, after the jewel box has been loaded into the package C. The end tabs 24, 26, 32 and 34, and the end flaps 20, 22, 28 and 30 are properly sized to close off the ends 131 and 132 of the package C.

FIGS. 4, 5, 6 AND 7

The security panel 10, when fully assembled within the package C, provides means for positioning the jewel box 134, shown in phantom lines, in an intermediate portion of and spaced from the ends 131 and 132 of the package C, as best shown in FIGS. 4 and 5. This prevents the jewel box 134 from sliding through any one of the ends 131 and 132 after the end has been opened by a would-be shop-lifter, making it relatively harder for the shop-lifter to remove the jewel box 134 from the package C by simply opening any one of the ends 131 and 132 of the package C.

The security panel 10 forms a pocket 136 adapted to the size of the jewel box 134 and longitudinally disposed relative to the longitudinal axis of the package C such that the jewel box 134 fits longitudinally therein, as best shown in FIGS. 4 and 5. The pocket 136 is defined by portions of side panels 4 and 8, portions of the front and back panels 2 and 6, respectively, and the edges 64 and 66 of the cut-out 62. The panel portions 118 and 140 in the first end portion 70, and the panel portions 120 and 138 in the second end portion 72 of the security panel 10 are each disposed substantially transversely to the front and back panels 2 and 6, as best shown in FIGS. 6 and 7, thereby permitting their inner edge portions 135, 137, 139 and 141 adjacent the pocket 136 to form stop means for maintaining the jewel box 134 in the intermediate portion of the package C.

As discussed in the above, the panel portions 126, 128 and 130 are secured by adhesive (not shown) or other conventional means (not shown) to the respective portions of the front panel 2, and the panel portion 114 to a portion of the back panel 6, as best shown in FIGS. 5, 6 and 7. However, the panel portion 143 is not secured to a respective portion of the back panel 6, thereby permitting the portion 143 to pivot along the hinge lines 82, 84, 86 and 88, for reasons which will be fully discussed below.

LOADING

FIGS. 8 THROUGH 14

The jewel box 134 is loaded into the package C from the open end 132, as best shown in FIG. 8. The arcuate edge portion 94 of the security panel 10 includes portions 142 and 144 which are inclined edges when erected, as best shown in FIG. 8. The edge portions 142 and 144 are inclined away from the leading end 146 of the jewel box 134 in a manner of a ramp. The edge portions 96 and 98 are similarly disposed in an inclined manner along the front panel 2 away from the leading end 146 of the jewel box 134. Thus, it can be seen that the edge 92 of the security panel 10, when fully assembled within the package C, presents a horizontally and vertically inclined edge to facilitate the loading of the jewel box 134, as best shown in FIG. 7.

As the jewel box 134 is pushed into the package C, the horizontally inclined edge portion 96 permits the leading end 146 of the jewel box 134 to slide into the package C without getting snagged. As the leading end 146 contacts the edge portions 142 and 144 and moves further into the package C, the inclined edge portions 142 and 144 cause the transverse portions 120 and 138 to pivot along the hinge lines 82, 84, 86 and 88, as best shown in FIG. 9 and 12. Since the panel portion 143 is not secured to the back panel 6, the panel portion 143 is, therefore, free to move, as best shown in FIG. 12, which permits the loading of the jewel box 134 into the package C. As the leading end 146 continues in its progress along the edge portions 142 and 144, the panel portions 120 and 138 continue to pivot and fold over, until they are substantially horizontal, as best shown in FIGS. 10 and 13. At this point, the panel portion 143 is substantially overlying the front panel 2, and the end portion 72 of the security panel 10 is substantially folded flat on the front panel 2, thereby allowing further unobstructed progress for the jewel box 134 in its movement into the package C.

When the leading end 146 of the jewel box 134 reaches the transverse edge portions 35 and 137 of the edge 64, the lagging end 148 of the jewel box 134 clears the edge 66. At this point, the jewel box 134 is now within the pocket 136, as best shown in FIGS. 4 and 5. Since the jewel box 134 is no longer pressing on the panel portion 72, the panel portions 120 and 138 return to their former transverse and locking positions, as best shown in FIG. 14. It is noted that since the hinge line 82 is a fold line while the hinge lines 84, 86 and 88 include slit lines, the panel portions 120 and 138 are relatively easy to fold down into the horizontal position from the advancing jewel box 134, and yet retains enough bias to permit the panel portions 120 and 138 to return to their original transverse and locking positions.

After the jewel box 134 in loaded into the package C, the end 132 of the package is closed off in the same manner as the end 131, as discussed above.

OPERATION
FIG. 15

When it is desired to retrieve the jewel box 134 from the package C, one simply holds and pulls the tab 54. The score lines 56 and 58 and the score line portions of the hinge lines 14 and 16 allow a relatively easy removal of the access panel 60. The perforated line 52 allows complete removal of the access panel 60 from the package C. The access panel 60 is conveniently positioned over the pocket 136 to thereby expose the jewel box 134 for easy removal. The jewel box 134 is then exposed for removal. The notch 90 allows one's finger to removed the jewel box 134 from the pocket 136.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:
1. A blank for forming a package for a compact disc jewel box, comprising:
   (a) a sheet;
   (b) said sheet having a front panel, a first side panel adjacent said front panel, a back panel adjacent said first side panel, a second side panel adjacent said back panel, and a security panel adjacent said second side panel;
   (c) each of said panels including a common hinge line interconnecting said adjacent panels;
   (d) said sheet being adapted for forming a package having said front, back, first and second side panels, first and second ends, and an intermediate portion;
   (e) said front, back, first and second side panels each having first and second end flaps;
   (f) each of said end flaps including a common hinge line interconnecting each of said end flaps to its respective panel;
   (g) said end flaps being adapted for closing said first and second ends of said package; and
   (h) said security panel including a cut-out in an intermediate portion thereof substantially spaced from said first and second ends of said package when said sheet is erected into said package for forming a pocket means therein for positioning the jewel box in said intermediate portion of said package.

2. A blank as in claim 1, wherein:
   (a) said security panel includes first and second end portions substantially separated by said cut-out.

3. A blank as in claim 2, wherein:
   (a) said first end portion is substantially rectangular.

4. A blank as in claim 2, wherein:
   (a) said second end portion includes includes an outer edge; and
   (b) said outer edge includes an arcuate portion.

5. A blank as in claim 4, wherein:
   (a) said arcuate portion is disposed in an intermediate portion of said outer edge.

6. A blank as in claim 5, wherein:
   (a) said outer edge includes first and second edge portions; and
   (b) each of said first and second edge portions includes an inclined edge portion.

7. A blank as in claim 2, wherein:
   (a) said cut-out is rectangularly U-shaped and includes first, second and third edges.

8. A blank as in claim 7, wherein:
   (a) said first edge is associated with said first portion;
   (b) said second edge is associated with said second portion; and
   (c) said second edge includes a notch.

9. A blank as in claim 7, wherein:
   (a) said security panel has a longitudinal axis;
   (b) said cut-out has a dimension substantially equal to the size of a jewel box; and
   (c) said cut-out is disposed such that the jewel box is disposed longitudinally of said security panel when the jewel box is fitted into said cut-out.

10. A blank as in claim 2, wherein:
(a) said security panel has a longitudinal axis;
(b) said first end portion includes a first center portion;
(c) said first center portion includes first and second portions on each side of said first center portion; and
(d) each of said first and second portions includes a pair of parallel spaced apart hinge lines disposed longitudinally of the axis of said security panel.

11. A blank as in claim 10, wherein:
(a) said second end portion includes a second center portion;
(b) said second center portion includes third and fourth portions on each side of said second center portion; and
(c) each of said third and fourth portions includes a pair of parallel spaced apart hinge lines disposed longitudinally of the axis of said security panel.

12. A blank as in claim 11, wherein:
(a) said first, second, third and fourth portions are folded along their respective pairs of hinge lines when the blank is formed into a package;
(b) said first and second portions are disposed transversely of said front and back panels when the blank is formed into the package; and
(c) said third and fourth portions are positionable between a transverse position relative to said front panel and a substantially flat position substantially adjacent said front panel when the blank is formed into the package.

13. A blank as in claim 1, wherein:
(a) said back panel includes an access panel for removing the jewel box from the package formed from the blank.

14. A blank as in claim 13, wherein:
(a) a substantial portion of said access panel overlies said cut-out when the blank is formed into a package.

15. A package for a compact disc jewel box, comprising:
(a) a receptacle having a front panel, a back panel, opposed side panels, a closed first end and an open second end;
(b) said receptacle being adapted for the jewel box to fit therein;
(c) said receptacle being substantially longer than the length of the jewel box;
(d) said receptacle having an intermediate portion substantially spaced from said first and second ends for positioning the jewel box therein;
(e) means operably associated with said front and back panels and one of said opposed side panels for preventing the jewel box from shifting position within said receptacle when the jewel box is positioned in said intermediate portion;
(f) said preventing means including collapsible insertion means automatically operable from the passage of the jewel box into said intermediate portion for permitting the jewel box to be inserted into said receptacle from said open second end, and
(g) means for closing said open second end.

16. A package as in claim 15, wherein:
(a) said preventing means includes pocket means adapted for the jewel box to fit therein.

17. A package as in claim 16, wherein:
(a) said pocket means includes a security panel having a cut-out substantially equal to the dimension of the jewel box; and
(b) said security panel includes first and second end portions substantially separated by said cut-out.

18. A package in claim 17, wherein:
(a) said first end portion is disposed adjacent said first end of said receptacle;
(b) said second end portion is disposed adjacent said second end of said receptacle and includes an outer edge; and
(c) said insertion means is operably associated with said second portion.

19. A package as in claim 18, wherein:
(a) said first end portion includes a first center portion secured to said back panel;
(b) said first end portion includes first and second portions operably associated with each side of said first center portion, and disposed substantially transversely thereto; and
(c) said first end portion includes means for securing said first and second portions to said front panel.

20. A package as in claim 18, wherein:
(a) said second end portion includes a second center portion normally disposed adjacent said back panel;
(b) said second end portion includes third and fourth portions operably associated with each side of said second center portion;
(c) said third and fourth portions are normally disposed substantially transversely with respect to said front panel; and
(d) said second end portion includes means for securing said third and fourth portions to said front panel.

21. A package as in claim 20, wherein:
(a) said second end portion includes means for causing said second center, third and fourth portions to lie substantially on said front panel when the jewel box is inserted from said second end of said receptacle into said pocket means.

22. A package as in claim 21, wherein:
(a) said causing means includes a first pair of spaced apart parallel hinge lines operably associated with said second center and third portions and disposed along the longitudinal axis of said receptacle, and a second pair of spaced apart parallel hinge lines disposed parallel to said first pair of hinge lines and operably associated with said second center and fourth portions.

23. A package as in claim 22, wherein:
(a) said second center portion includes outer edge portions generally disposed inwardly toward said pocket means, thereby facilitating insertion of the jewel box into said receptacle.

24. A package as in claim 16, wherein:
(a) said pocket means has a longitudinal axis parallel to the longitudinal axis of said receptacle such that the jewel box when placed within said pocket means is disposed longitudinally of said receptacle.

25. A package as in claim 16, wherein:
(a) said receptacle includes an access means for removing the jewel box from said receptacle.

26. A package as in claim 25, wherein:
(a) said access means includes an access panel disposed on said back panel and substantially overlying said pocket means.

27. A package as in claim 26, wherein:
(a) said pocket means includes a notch for retrieving the jewel box therefrom when said access panel is removed.

* * * * *